(12) United States Patent
Nabell et al.

(10) Patent No.: US 6,377,435 B1
(45) Date of Patent: Apr. 23, 2002

(54) CIRCUIT DESIGN FOR DATA/TELEPHONE TIP/RING PAIR SURGE PROTECTION

(75) Inventors: Robert E. Nabell, Quincy, FL (US); Bryan R. Cole, Nichols, NY (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/428,800

(22) Filed: Oct. 28, 1999

Related U.S. Application Data

(60) Provisional application No. 60/105,898, filed on Oct. 28, 1998.

(51) Int. Cl.[7] .................................................. H01C 7/12

(52) U.S. Cl. ....................................... 361/119; 361/124

(58) Field of Search ................................. 361/111, 117, 361/119, 124, 126, 127, 138, 54, 56; 379/399, 412

(56) References Cited

U.S. PATENT DOCUMENTS

| | | | | |
|---|---|---|---|---|
| 4,903,295 A | * | 2/1990 | Shannon et al. | 379/437 |
| 5,555,153 A | * | 9/1996 | Frederiksen et al. | 361/119 |
| 5,909,349 A | * | 6/1999 | Brower et al. | 361/117 |
| 6,031,706 A | * | 2/2000 | Nabell | 361/111 |
| 6,040,972 A | * | 3/2000 | Takeuchi | 361/119 |

* cited by examiner

*Primary Examiner*—Kim Huynh
(74) *Attorney, Agent, or Firm*—Howrey Simon Arnold & White

(57) ABSTRACT

A circuit for protection of communication lines, including tip and ring lines, each having a protected side and an unprotected side; first and second overcurrent devices connected in series with the unprotected side of the tip and ring lines line; a grounded over-voltage clamping device connected to both the tip line and the ring line at a point intermediate the protected side and the unprotected side, the clamping device being connected to ground; and first and polymer PTC elements connected, respectively, in series with the protected side of the tip and ring lines.

17 Claims, 3 Drawing Sheets

CIRCUIT DESIGN FOR DATA/TELEPHONE TIP/RING PAIR SURGE PROTECTION

CROSS REFERENCE TO RELATED APPLICATIONS

This application claims the benefit of U.S. Provisional Application No. 60/105,898, filed on Oct. 28, 1998 by the same inventors, which is incorporated herein by reference in its entirety.

FIELD OF THE INVENTION

This invention relates to surge protection. More specifically, this invention relates to improved surge protection for tip and ring pair lines in telephone and data devices.

BACKGROUND OF THE INVENTION

Communications equipment, e.g., telephones, fax machines and computers, is commonly connected to telephone lines or similar data transmitting lines, such that a pair of lines, known as the "tip and ring pair," exists between the equipment terminals and other terminals on a transmission line. Certain surge protection devices are commonly placed on the tip and ring lines in order to protect the connected equipment from unwanted surges in electrical energy. These devices usually provide overvoltage and/or overcurrent protection. For these surge protection devices, Underwriters Laboratory sets certain requirements, such as UL497/497A.

Despite the advantages of overcurrent and overvoltage devices, it has long been known that sneak currents (relatively low current and voltage) can penetrate existing protector designs and cause considerable damage to equipment circuit cards. In satisfaction of the UL497 and 497A standards, current designs of communications surge protectors utilize overcurrent devices incapable of mitigating the affects of sneak currents. These devices include fuses and relatively high voltage PTCs (Positive Temperature Coefficient Thermistors). Overvoltage clamping devices may also be included in such devices. The operation of such overvoltage clamping devices will be understood by those skilled in the art.

Since the fuses and high voltage PTC protection circuits commonly used to meet UL overcurrent requirements are too slow too mitigate sneak currents, an object of the invention is an improved circuit design that both meets UL requirements and provides effective sneak current protection.

SUMMARY OF THE INVENTION

The present invention in one embodiment is a circuit for protection of data and telephone tip/ring pair lines. The circuit includes tip and ring lines, each having a protected side and an unprotected side; first and second overcurrent devices connected in series with the unprotected side of the tip and ring lines line; a grounded over-voltage clamping device connected to both the tip line and the ring line at a point intermediate the protected side and the unprotected side, the clamping device being connected to ground; and first and polymer PTC elements connected, respectively, in series with the protected side of the tip and ring lines.

BRIEF DESCRIPTION OF THE DRAWINGS

The following figures form part of the present specification and are included to further demonstrate certain aspects of the present invention. The invention may be better understood by reference to one or more of these drawings in combination with the detailed description of specific embodiments presented herein. In the drawings.

Figure 1:
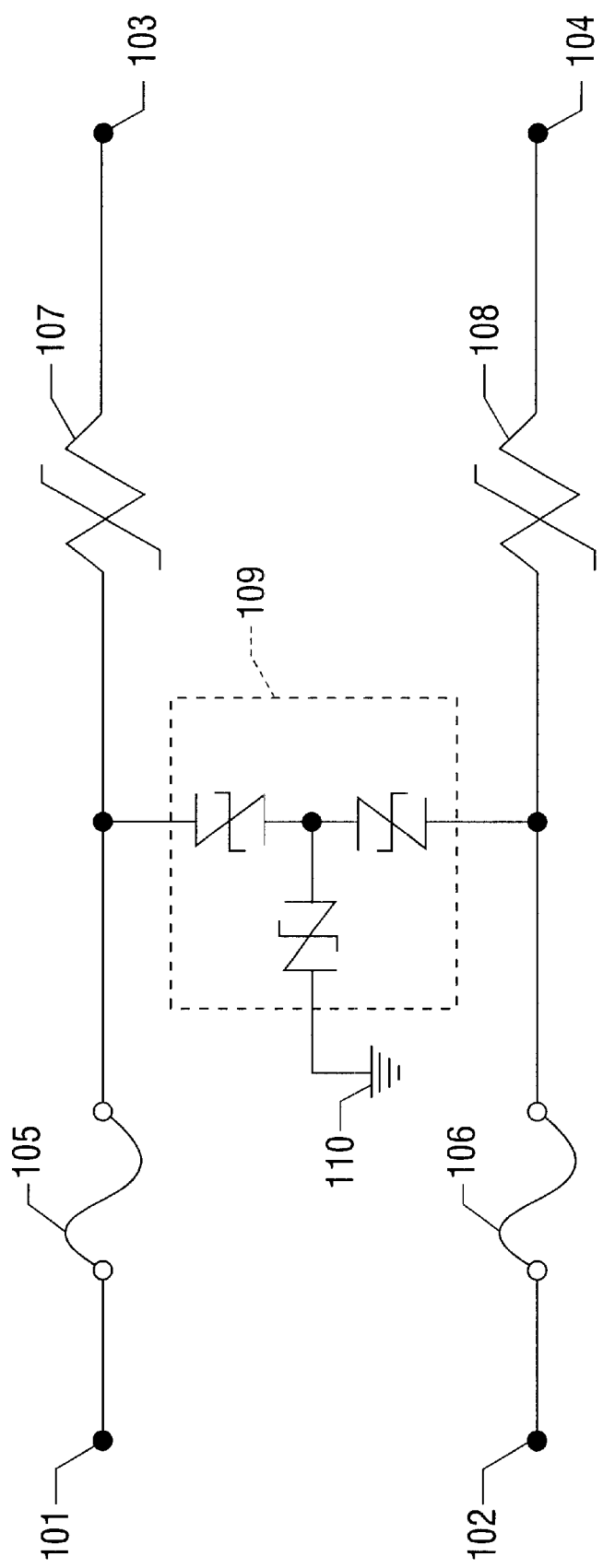
FIG. 1 shows an improved circuit design according to certain features of the present invention making use of fuse devices.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers'specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention in its various aspects may be embodied in many variations. In a first embodiment, FIG. 1 shows an improved tip/ring protection circuit constructed in accordance with certain features of the present invention. The line containing terminals 101 and 103 represents the tip line. The line containing terminals 102 and 104 represents the ring line. Electrical equipment such as telephones, computers or similar data equipment are connected to the protected tip and ring lines at terminals 103 and 104, respectively. The improved circuit is connected to telephone lines at terminals 101 and 102. It is one object of the protection circuit of FIG. 1 to protect the equipment side from unwanted current surges originating on the line side.

In its simplest form, the embodiment of FIG. 1 comprises five components: a first set of protection components, one on the tip line and one on the ring line to meet UL 497/497A requirements; a second set of protection components, one on the tip line and one on the ring line, to mitigate sneak currents; and an over-voltage clamping device, connected to both the tip line and the ring line, and to ground.

Referring to the embodiment of FIG. 1, a first set of protection components, fuses (105,106), are utilized to meet UL 497/497A requirements. The fuses 105 and 106 may constitute any acceptable fuse elements commonly known to those of ordinary skill in the art. For example, 1-amp "2AG SLO-BLO®" fuses, available from Littelfuse, may be used. The fuses are positioned such that one fuse element 105 is in series with the unprotected (or line) side of the tip line and the other fuse element 106 is in series with the unprotected (or line) side of the ring line.

In the illustrative embodiment, an overvoltage device 109 is coupled across the tip and ring lines at a position intermediate the unprotected side, defined by terminals 101 and 102, and the protected side, defined by terminals 103 and 104. The overvoltage device is also coupled to ground via line 110. The overvoltage device 109 may be any of a number of suitable overvoltage protection circuits and in one contemplated embodiment comprises a solid state SIDACTOR™ overvoltage clamping device available from Teccor Electronics, Inc., with a clamping voltage of 200 volts (e.g., on analog single line set extensions and central office trunk lines). One skilled in the art will recognize that other overvoltage circuits may be used.

A second set of protection devices comprising fast polymer PTCs (107, 108) are utilized to mitigate sneak currents. The components that make up this second set are positioned such that one element 107 is in series with the protected (or equipment) side of the tip line and the other element 108 is in series with the protected (or equipment) side of the ring line. To provide the high speed required to mitigate sneak currents, the relatively low voltage, fast polymer PTCs should be selected according to the guidelines that follow.

In one embodiment, a ratio describing the proper coordination between the slower primary overcurrent protection devices (in the case of FIG. 1, fuses 105 and 106) and the fast polymer PTCs (107, 108) is obtained by dividing the trip time of the fast polymer PTC, at a given sneak current amperage, by the trip time of the slower primary overcurrent device, at that same sneak current amperage. In the illustrated embodiment, the ratio has been estimated for sneak currents in the range of 1.0 to 2.0 amps. However, the ratio varies according to characteristics of the overvoltage clamping device 109.

In the illustrative embodiment where the primary overcurrent devices are fuses (105,106), this ratio may be approximated according to formula described in Equation 1.

$$\text{Ratio} \leq (0.00087) * (\text{Clamping Voltage (v)}) - 0.024 \quad \text{Equation 1}$$

Thus, using Equation 1, a ratio of trip times of less than about 0.15 should be maintained in circuits employing an overvoltage protection device with a 200 volt clamping voltage. For circuits employing an overvoltage protection device clamping at 85 volts (e.g., for a digital extension ), a ratio of trip times of less than about 0.05 should be maintained. For an overvoltage protection device clamping at 230 volts, a ratio of trip time less than about 0.18 should be used.

Using the ratio of trip times, the fast polymer PTC elements (107, 108) may be appropriately selected. For example, when the desired clamp voltage is less than about 85 volts, the PTC elements (107, 108) may comprise Raychem RXE017 devices. Under other circumstances, for example when the desired clamp voltage is 200 volts or greater, the PTC elements (107, 108) may comprise Raychem TR250-145 elements. In most embodiments polymer PTC elements may be utilized for elements 107 and 108, as testing has shown that small polymer PTCs are faster than corresponding ceramic PTC designs.

It should be noted that the above formula and guidelines are for purposes of illustration only, and that the present invention may be practiced in a manner which does not fall within Equation 1.

Figure 2:
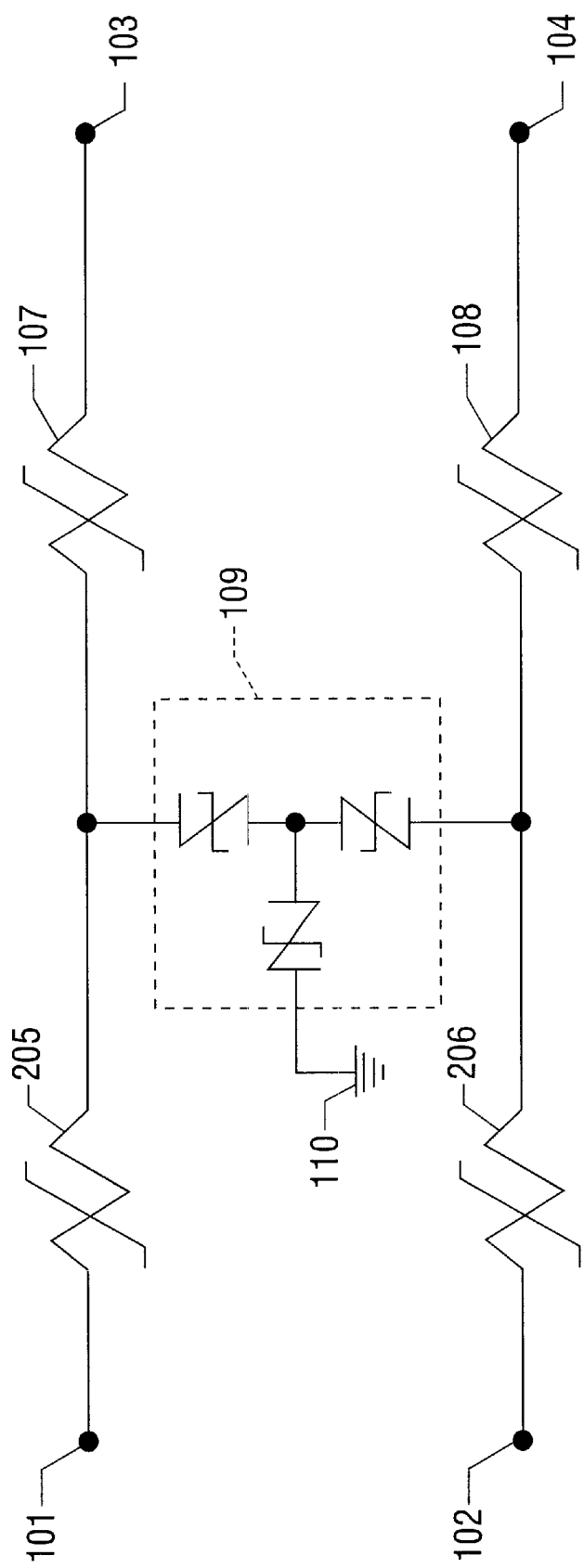
FIG. 2 shows an improved circuit design according to certain features of the present invention making use of positive temperature coefficient thermisters.

In a second embodiment, FIG. 2 shows an improved tip/ring protection circuit constructed in accordance with certain features of the present invention.

Referring to FIG. 2, the illustrated circuit is similar in many respects to the first embodiment shown generally in FIG. 1. Many of the components of FIG. 1 are used in the circuitry of FIG. 2, as reflected by the common component designators. In the embodiment of FIG. 2, the fuses (105, 106) are replaced with relatively high voltage and typically physically large PTC devices (205, 206) sized to meet UL497/497A requirements. Examples of PTCs that may be used to construct the circuit of FIG. 2 are the Raychem TR600-150 and TR600-160. The remainder of the circuit is as described above in connection with FIG. 1.

In the second embodiment, where the primary overcurrent devices are large PTC's (205,206), a ratio of trip times may be approximated according to Equation 2.

$$\text{Preferred Ratio} \leq (0.00348) * (\text{Clamping Voltage (v)}) - 0.046 \quad \text{Equation 2}$$

Thus, using Equation 2, a ratio of trip times of less than about 0.65 should be maintained in circuits employing an overvoltage protection device clamping at 200 volts. For circuits employing an overvoltage protection device clamping at 85 volts, a ratio of trip times of less than about 0.25 should be maintained. For circuits employing an overvoltage protection device clamping at 230 volts a ratio of trip times of less than about 0.75 should be maintained.

Again, it should be noted that Equation 2 represents only one embodiment for purposes of illustration only, and that the present invention may be practiced in a manner that may not fall within Equation 1.

Figure 3:
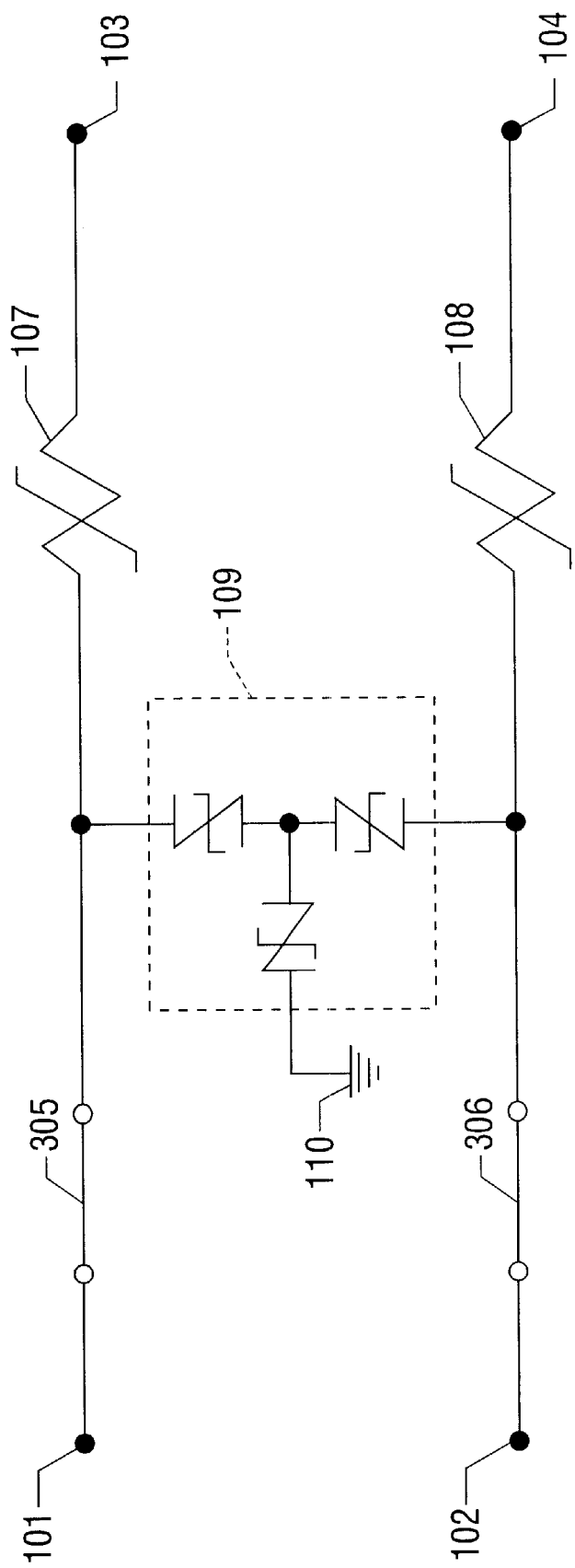
FIG. 3 shows an improved circuit design according to certain features of the present invention using thin art work traces.

In a third embodiment, FIG. 3 shows an improved tip/ring protection circuit constructed in accordance with certain features of the present invention. Like FIG. 2, the circuit shown in FIG. 3 is similar in many respects to the circuit shown in FIG. 1, with many similar components, as reflected by the common component designators. In the circuit of FIG. 3, however, very thin, e.g., ≦0.005 inches, printed circuit board artwork traces (305, 306) known as thin artwork traces ("TATs") are used to form the first set of protective components. The TATs (305, 306) serve as fuse elements in satisfaction of UL requirements. The remainder of the circuit serves the same functions as described in FIG. 1. It will be noted by those skilled in the art that the thin artwork traces may be replaced by very fine magnet wires for the fuse elements.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A protection circuit for a communication line, the communication line including a tip line and a ring line, the tip line and the ring line each having a protected side and an unprotected side, the protection circuit comprising:

(a) a first overcurrent device coupled in series with the unprotected side of the tip line;

(b) a second overcurrent device coupled in series with the unprotected side of the ring line;

(c) a voltage clamping device coupled across the tip line and the ring line at a point intermediate the protected side and the unprotected side, the voltage clamping device including a connection to ground;

(d) a first polymer positive temperature coefficient thermistor (PTC) element connected in series with the protected side of the tip line; and (e) a second polymer PTC element connected in series with the protected side of the ring line.

2. The protection circuit of claim 1, wherein the first overcurrent device is a fuse and the second overcurrent device is a fuse.

3. The protection circuit of claim 2, the first polymer PTC having a characteristic trip time for sneak current A ($\text{Trip}_{PTC}$), the first overcurrent device having a characteristic trip time for sneak current A ($\text{Trip}_{OCD}$), and the voltage clamping device having a characteristic clamping voltage in units of volts ($V_{clamp}$), wherein the relationship between the first polymer PTC, first overcurrent device, and voltage clamping device is defined by the equation:

$$(\text{Trip}_{PTC} + \text{Trip}_{OCD}) \leq (0.00087)*(V_{clamp}) - 0.024.$$

4. The protection circuit of claim 1, wherein the first overcurrent device is a thin artwork trace (TAT) and the second overcurrent device is a TAT.

5. The protection circuit of claim 4, the first polymer PTC having a characteristic trip time for sneak current A ($\text{Trip}_{PTC}$), the first overcurrent device having a characteristic trip time for sneak current A ($\text{Trip}_{OCD}$), and the voltage clamping device having a characteristic clamping voltage in units of volts ($V_{clamp}$), wherein the relationship between the first polymer PTC, first overcurrent device, and voltage clamping device is defined by the equation:

$$(\text{Trip}_{PTC} + \text{Trip}_{OCD}) \leq (0.00087)*(V_{clamp}) - 0.024.$$

6. The protection circuit of claim 1, wherein the first overcurrent device is a thin fine magnet wire and the second overcurrent device is a fine magnet wire.

7. The protection circuit of claim 6, the first polymer PTC having a characteristic trip time for sneak current A ($\text{Trip}_{PTC}$), the first overcurrent device having a characteristic trip time for sneak current A ($\text{Trip}_{OCD}$), and the voltage clamping device having a characteristic clamping voltage in units of volts ($V_{clamp}$), wherein the relationship between the first polymer PTC, first overcurrent device, and voltage clamping device is defined by the equation:

$$(\text{Trip}_{PTC} + \text{Trip}_{OCD}) \leq (0.00087)*(V_{clamp}) - 0.024.$$

8. The protection circuit of claim 1, wherein the first overcurrent device is a PTC and the second overcurrent device is a PTC.

9. The protection circuit of claim 8, the first polymer PTC having a characteristic trip time for sneak current A ($\text{Trip}_{PTC}$), the first overcurrent device having a characteristic trip time for sneak current A ($\text{Trip}_{OCD}$), and the voltage clamping device having a characteristic clamping voltage in units of volts ($V_{clamp}$), wherein the relationship between the first polymer PTC, first overcurrent device, and voltage clamping device is defined by the equation:

$$(\text{Trip}_{PTC} + \text{Trip}_{OCD}) \leq (0.00087)*(V_{clamp}) - 0.024.$$

10. The protection circuit of claim 1, wherein the voltage clamping device is a crowbar thyristor.

11. A protection circuit for a communication line, the communication line including a tip line and a ring line, the tip line and the ring line each having a protected side and an unprotected side, the protection circuit comprising:

(a) a first overcurrent device coupled in series with the unprotected side of the tip line;

(b) a second overcurrent device coupled in series with the unprotected side of the ring line;

(c) a voltage clamping device coupled across the tip line and the ring line;

(d) means for protecting against sneak current on the tip line; and (e) means for protecting against sneak current on the ring line.

12. The protection circuit of claim 11, wherein the first overcurrent device is a fuse and the second overcurrent device is a fuse.

13. The protection circuit of claim 11, wherein the first overcurrent device is a thin artwork trace (TAT) and the second overcurrent device is a TAT.

14. The protection circuit of claim 11, wherein the first overcurrent device is a thin fine magnet wire and the second overcurrent device is a fine magnet wire.

15. The protection circuit of claim 11, wherein the first overcurrent device is a PTC and the second overcurrent device is a PTC.

16. The protection circuit of claim 15, wherein the PTC is polymer PTC.

17. The protection circuit of claim 11, wherein the voltage clamping device is a crowbar thyristor.

* * * * *